(12) United States Patent
Fenn et al.

(10) Patent No.: US 12,431,625 B2
(45) Date of Patent: Sep. 30, 2025

(54) FIBER BASED RF PHASED-ARRAY ANTENNAS

(71) Applicant: Massachusetts Institute of Technology, Cambridge, MA (US)

(72) Inventors: Alan J. Fenn, Wayland, MA (US); Alexander Stolyarov, Westford, MA (US); Siva Yegnanarayanan, Lexington, MA (US); Lauren Cantley, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 326 days.

(21) Appl. No.: 18/199,564

(22) Filed: May 19, 2023

(65) Prior Publication Data

US 2023/0378649 A1 Nov. 23, 2023

Related U.S. Application Data

(60) Provisional application No. 63/344,129, filed on May 20, 2022.

(51) Int. Cl.
*H01Q 5/48* (2015.01)
*H04B 10/2575* (2013.01)

(52) U.S. Cl.
CPC ......... *H01Q 5/48* (2015.01); *H04B 10/25759* (2013.01)

(58) Field of Classification Search
CPC .......................... H01Q 5/48; H04B 10/25759
See application file for complete search history.

(56) References Cited

PUBLICATIONS

Andujar et al.; "A Systematic Method to Design Broadband Matching Networks"; Proceedings of the Fourth European Conference on Antennas and Propagation; Apr. 12, 2010; 5 Pages.
Bach et al.; "Directivity of basic linear arrays"; IEEE Transactions on Antennas and Propogation; vol. 18, No. 1; Jan. 1970; 5 Pages.
Cox et al.; "Photonics for phased array systems"; IEEE International Symposium on Phased Array Systems and Technology; Oct. 12, 2010; 4 Pages.
Lee et al.; "Performance of an optically fed conformal array"; Proceedings of IEEE Antennas and Propagation Society International Symposium and URSI National Radio Science Meeting; vol. 2; Jun. 1994; 4 Pages.

(Continued)

*Primary Examiner* — Graham P Smith
(74) *Attorney, Agent, or Firm* — Daly, Crowley, Mofford & Durkee, LLP

(57) ABSTRACT

Described is a flexible thermally-drawn receive phased array antenna and antenna system and a process for making the same. The phased array antenna system includes a plurality of antenna elements and one or more low noise amplifiers (LNAs) encapsulated in a fiber such as flexible polyetherimide (PEI) fiber material. A DC bias for the LNAs and other components is provided by one or more electrically conducting wires disposed in proximity to the antenna elements and also encapsulated in the fiber. In embodiments, the antenna elements are provided as dipole antenna elements and the phased array antenna is provided as a flexible thermally-drawn linear dipole receive phased array antenna operable at UHF frequencies.

20 Claims, 13 Drawing Sheets

(56) References Cited

PUBLICATIONS

Matthews et al.; "A Wide-Band Fiber-Optic True-Time Steered Array Receiver Capable of Multiple Independent Simultaneous Beams"; IEEE Photonics Technology Letters; vol. 10, No. 5; May 1998; 3 Pages.

Meng et al.; "An Up/Downstream Shared Optical Beam Forming Network for Remote Phased Array Antenna"; IEEE Photonics Journal; vol. 13, No. 3; Jun. 2021; 10 Pages.

Yegnanarayanan et al.; "Recirculating photonic filer: a wavelength-selective time delay for phased-array antennas and wavelengths code-division multiple access"; Optics Letters; vol. 21, No. 10; May 15, 1996; 3 Pages.

Zhou et al.; "Integrated Photonics for RF-Photonic Phased-Array Radar System"; IEEE Research and Applications of Photonics In Defense Conference; Aug. 2018; 4 Pages.

Zmuda et al.; "Photonic Beamformer for Phased Array Antennas Using A Fiber Grating Prism"; IEEE Photonics Technology Letters; vol. 9, No. 2; Feb. 1997; 3 Pages.

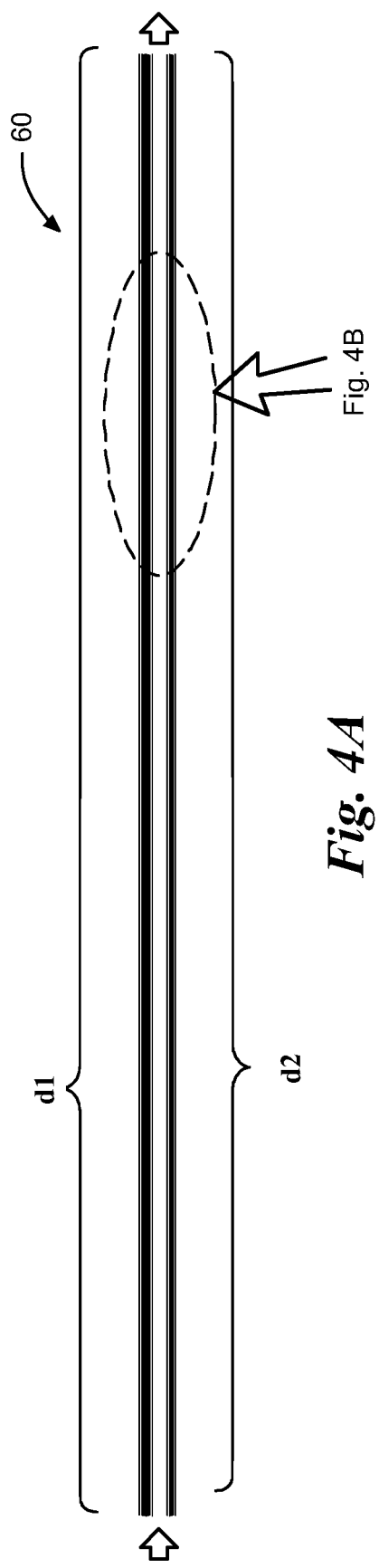
*Fig. 4A*
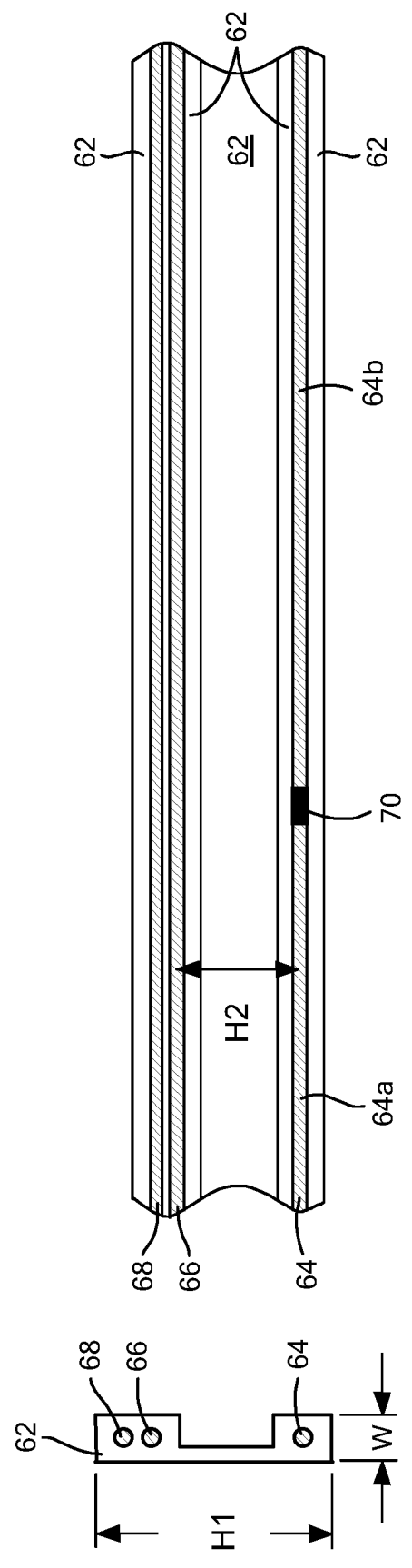
*Fig. 4B*
*Fig. 4C*

FIBER BASED RF PHASED-ARRAY ANTENNAS

RELATED APPLICATIONS

This application claims the benefit under 35 U.S.C. § 119(e) of provisional application No. 63/344,129 filed on May 20, 2022 which application is incorporated herein by reference in its entirety.

GOVERNMENT LICENSE RIGHTS

This invention was made with government support under FA8702-15-D-0001 awarded by the U.S. Air Force. The government has certain rights in the invention.

BACKGROUND

The application of photonics technology to the design of transmit and receive phased array antennas has been explored by a number of researchers.

SUMMARY

In accordance with one aspect of the concepts disclosed herein, described are flexible multifunctional fiber-optics radio frequency (RF) phased array antennas and antenna systems (e.g., transmit and/or receive systems) comprising a photonics/RF array antenna. In embodiments, the photonics/RF dipole array antenna may be provided using a fiber drawing process. In embodiments, the photonics/RF dipole array antenna may be provided as a linear array antenna. In embodiments, the photonics/RF dipole array antenna may comprise a plurality of dipole antenna elements (or more simply "dipoles") and thus the photonics/RF dipole array antenna be provided as a photonics/RF dipole linear array antenna.

Photonics/RF dipole array antennas provided in accordance with the concepts described herein may be appropriate for use as a receive dipole array antenna capable of operation in the ultrahigh frequency (UHF) band.

In embodiments, the photonics/RF dipole array antenna may be coupled to one or more amplifiers and photonics components to provide a fiber-based antenna system. In embodiments, the RF amplifiers may be provided as low noise amplifiers (LNAs) in a receive signal path of a phased array antenna system. In embodiments, DC bias signals for the LNAs and/or other components may be provided by one or more electrically conducting signal paths (e.g., a wire bus) disposed in proximity to the dipole antenna elements. In embodiments, optical paths for optical components may be provided by one or more optical fiber signal paths disposed in proximity to the dipole antenna elements. In embodiments, such a photonics/RF dipole array antenna may be provided using a fiber drawing process such that all components are encapsulated in a fiber.

In embodiments, the dipole antenna elements may be fed off-center relative to their own geometry. This approach provides a desired impedance match between the antenna elements and other circuit components.

In accordance with a further aspect of the concepts disclosed herein, described is a flexible thermally-drawn linear phased array comprising RF and photonics components. Such a thermally-drawn linear phased array antenna may be appropriate for use in an RF receiver. Such a thermally-drawn linear dipole phased array provided in accordance with the concepts described herein may find use in a conformal receive array aperture with digital beamforming. Such conformal receive array apertures with digital beamforming can be provided by combining multiple thermally-drawn linear dipole array antennas in a desired antenna configuration.

The presence of an electrically conducting wire power bus disposed in proximity to a thermally-drawn linear dipole phased array antenna system comprising RF and photonics components may utilize an offset antenna feed design for the dipole antenna elements. Such an offset antenna feed may comprise inductive and capacitive components coupled in parallel to provide an impedance matching circuit (e.g., LC impedance matching).

In embodiments, a photonics/RF dipole array antenna may be provided as a photonics/RF linear dipole phased array antenna operating in a UHF band (420 to 450 MHz) and having an input port voltage standing wave ratio (VSWR) of less than three (3) to one (1) (VSWR<3:1) for scan angles up to +/−15° from broadside for an array comprising four (4) dipole antenna elements.

In accordance with a further aspect of the concepts described herein, a radio frequency (RF)/optical system includes: (a) a plurality of antenna elements encapsulated in a fiber material, each of the fiber encapsulated antenna elements responsive to signals in a corresponding one of a like plurality of optical wavelengths; (b) a like plurality of RF/optical modules, each of the RF/optical modules coupled to a corresponding one of the fiber encapsulated antenna elements, and each of the RF/optical modules comprising: (b1) a means for coupling the RF/optical module to a respective one of the fiber encapsulated antenna elements; (b2) an RF amplifier configured to receive RF signals from the respective one of the fiber encapsulated antenna elements; (b3) an RF-to-optical converter, coupled to receive an RF signal provided to a first port thereof and to provide a corresponding optical signal at a second first port thereof; (c) an optical input signal path coupled to the plurality of RF/optical modules; and (d) an optical output signal path coupled to the plurality of RF/optical modules.

In accordance with a still further aspect of the concepts described herein, a wavelength division multiplexing (WDM) system includes a multiwavelength continuous wave (MWCW) laser source; an optical multiplexer (MUX) coupled to the MWCW laser source and configured to couple a plurality of optical signals to a first optical fiber; an array antenna having a plurality of antenna elements with at least some of the antenna elements of the array antenna operative with signals of a dedicated one of a plurality of optical wavelengths; a like plurality of RF/optical modules coupled to the first optical fiber and to corresponding ones of the plurality of antenna elements, each RF/optical module comprising an optical modulator configured to convert a received antenna signal coupled thereto from the corresponding antenna element to an optical signal at its dedicated optical wavelength and allow remaining WDM signals to pass therethrough; a second optical fiber coupled the RF/optical modules and configured to couple modulated optical signals from each RF/optical module to a demultiplexer (DEMUX) for separation by wavelength; and means for converting each optical signal channel to an electrical signal; and a beamforming network (BFN) coupled to receive electrical signals provided by the means for converting.

In accordance with a still further aspect of the concepts described herein, a wavelength division multiplexing (WDM) system includes: an optical multiplexer (MUX) disposed to couple a plurality of CW laser inputs to a first optical fiber with the optical fiber being coupled to a plurality of RF/optical modules comprising an optical modulator; an array antenna having a like plurality of antenna elements, the plurality of antenna elements coupled to respective ones of the plurality of RF/optical modules with each RF/optical module configured to convert/modulate received antenna signals to an optical signal at a respective one of a plurality of dedicated wavelengths while allowing the remaining optical signals to pass therethrough and wherein the converted/modulated optical signals are coupled through a second optical fiber to a demultiplexer (DEMUX) for separation by wavelength and wherein each demultiplexed optical signal is converted to an electrical signal and coupled to a beamforming network (BFN).

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIGS. 3A-3D are a series of schematic diagrams illustrating a preform-to-fiber draw process in which FIG. 3A illustrates electrical conductors and fiber optic cables drawn into a fiber; FIG. 3B illustrates fiber cladding locally removed to expose portions of dipole antenna elements, a access power bus and optical transmission lines; FIG. 3C illustrates insertion of Discrete components into the fiber; and FIG. 3D illustrates a fiber coated with a protective encapsulate.

FIG. 4A is a cross-sectional view of a unit cell of a photonics/RF linear array antenna;

FIG. 4B is an expanded view of a portion of the unit cell of shown in FIG. 4A;

FIG. 4C is an end of the portion of the unit cell shown in FIG. 4B;

DETAILED DESCRIPTION

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Figure 1:
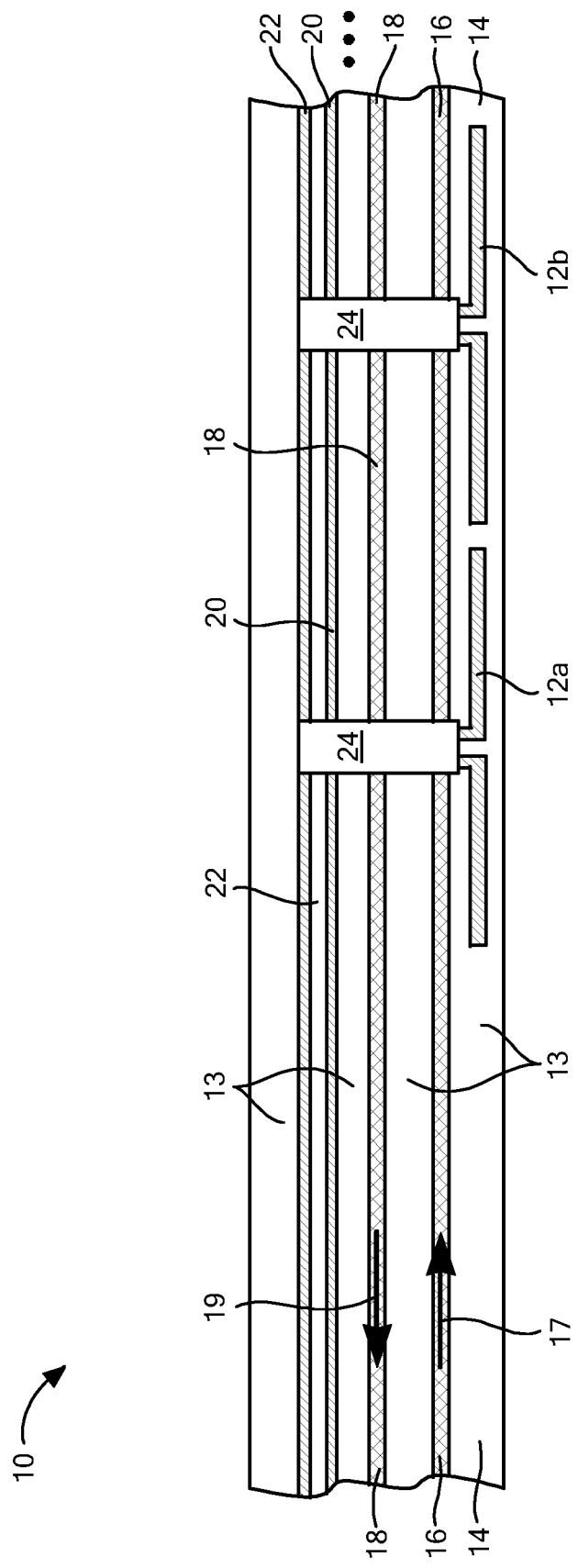
FIG. 1 is a cross-sectional view of a photonics/RF linear array antenna.

Referring now to FIG. 1, a portion of a photonics/RF linear array antenna 10 comprises an array of antenna elements (with two antenna elements 12a, 12b being shown in FIG. 1) encapsulated in flexible polyetherimide (PEI) fiber material. Those of ordinary skill in the art will appreciate that array antenna may comprise a plurality of antenna elements. In this example embodiment, the antenna elements are provided as dipole antenna elements (sometimes referred to herein more simply as "dipoles") encapsulated in flexible polyetherimide (PEI) fiber material 13.

In embodiments, the dipole elements are provided as thin-wire dipole antenna elements. In embodiments, the dipole may be provided from a wire. In embodiments, the wire dipole may be provided having a circular cross-sectional. In embodiments, the wire dipole may be provided having a diameter which is in the range of 10-30 times less than the length of the dipole and preferably in the range of 15-25 times less than the length of the dipole and even more preferably about 20 times less 20 times than the length of the dipole. In embodiments, the wire dipole may be provided having a rectangular, square, oval or triangular cross-sectional shape.

Photonics/RF linear array antenna 10 further comprises one or more RF/optical element modules 24 (or more simply "modules") coupled to each antenna element 12a, 12b. RF/optical element modules 24 may comprise, for example, one or more of: low noise amplifier(s) (LNAs), matching circuit(s) (to provide an impedance match between antenna elements 12 and other circuit components such as circuit components in modules 24), a balun, a voltage regulator, an RF to optical modulator and one or more other optical components. In general, the dipole antenna element is provided having an input resistance which is well matched to an impedance of the RF/optical module to which the antenna element is coupled.

Photonics/RF linear array antenna 10 further comprises one or more optical fibers. In this example, Photonics/RF linear array antenna 10 comprises two optical fibers 16, 18 with fiber 16 here configured to carry an optical input signal 17 and fiber 18 configured to carry an optical received signal 19 (i.e., input signal 17 is provided to modules 24 and receive signals 19 propagate out of modules 24).

Photonics/RF linear array antenna 10 further comprises one or more DC power buses with two DC power buses 20, 22 shown in the example of FIG. 1. At least some modules 24 are coupled to at least one optical fiber and/or at least one DC power bus.

As will be explained in further detail below, to provide array antenna 10, one or more continuous electrically conducting wires may be drawn into a polymer fiber carrier (e.g., a PEI fiber) to form the DC power bus and the wire antenna. The wire antenna line is subsequently cut or otherwise separated or broken to form the antenna dipoles. Optical fibers 16, 18, DC power buses 20, 22 and modules 24 are encapsulated in encapsulated in the flexible PEI fiber material. Also, one or more fiber optic transmission lines are also drawn into the flexible PEI fiber carrier. In this example design, to provide a desired RF sensitivity to incident fields, a low-noise amplifier (LNA) with balun and impedance matching circuit may be coupled to terminals of the dipole antenna elements. Using an optical input carrier, the optical modulator converts the received RF signal to an optical one, which is then coupled and transmitted along a low-loss fiber optic cable. As will be described below in conjunction with FIG. 2, wavelength division multiplexing on a single fiber or multiple fibers can be utilized to provide a multi-element phased array.

In operation, RF signals are received via dipole antenna elements 12a, 12b. Received RF signals are coupled to RF/optical element modules 24. Modules 24 convert RF signals provided thereto to optical signals via input optical signals 17 and an RF-to-optical converter, for example. Modules 24 provide optical output signals 19 which may be provided to a detector, demultiplexer or other receiver component.

Figure 2:
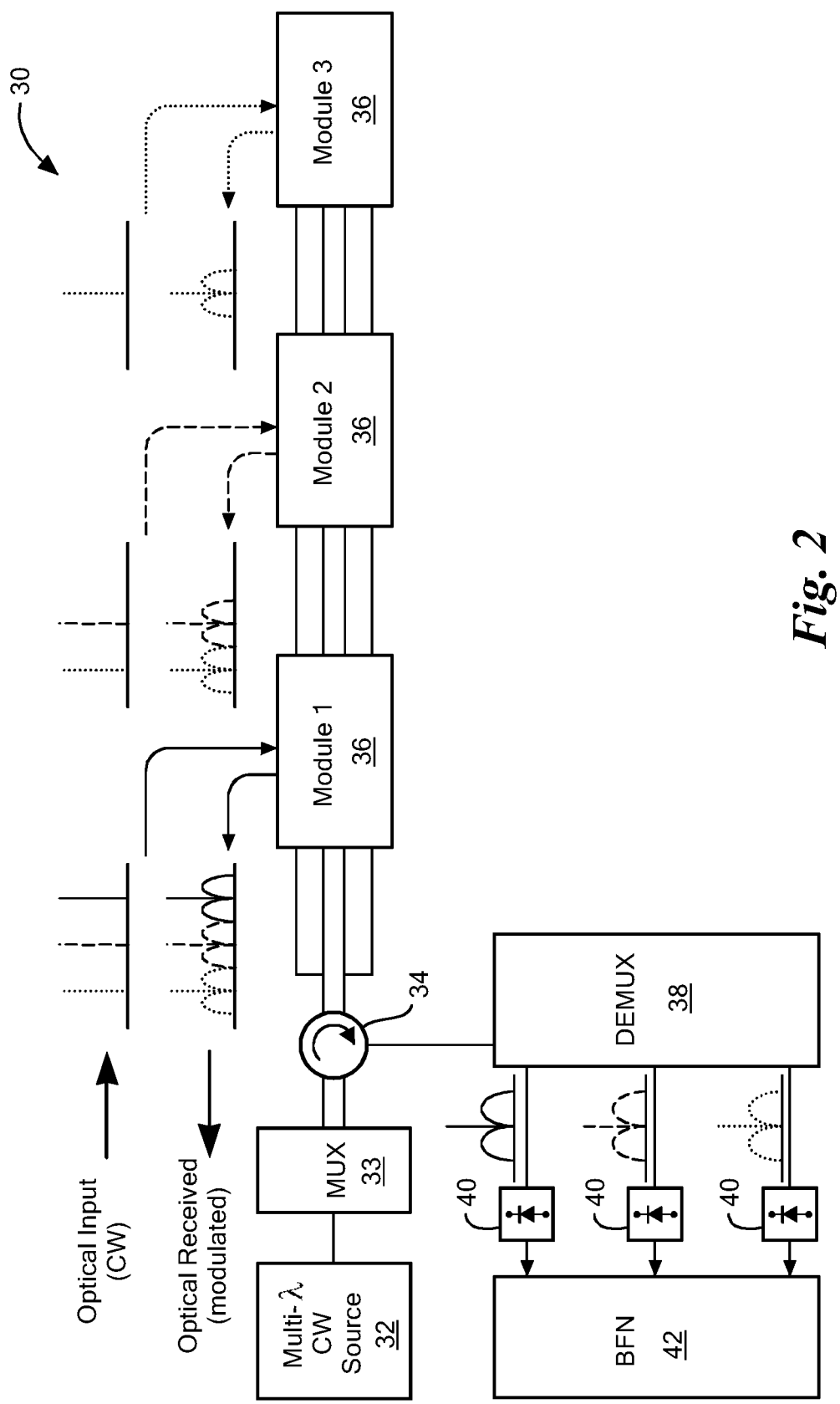
FIG. 2 is a block diagram of an example topology for a wavelength division multiplexing (WDM) system comprising a photonics/RF linear array antenna.

Referring now to FIG. 2, a wavelength division multiplexing (WDM) system 30 having an example topology includes a photonics/RF linear array antenna which may be the same as or similar to the photonics/RF linear array antenna of FIG. 1. Each antenna element-RF/optical module pair of the array has a dedicated optical wavelength.

WDM system 30 further includes continuous wave (CW) laser source 32 which may provide multiple laser signals. CW source 32 may provide signals at the same of different wavelengths. CW source 32 provides signals to an optical multiplexer (MUX) 33 through an optical signal path (e.g., one or more optical fibers such as one or more silica optical fibers). MUX 33 is configured to couple one or more laser signals from CW laser source 32 through an isolation circuit 34 (e.g., a circulator, optical transmit received switch or other device) to one or more of a plurality of element modules 36 (sometimes referred to herein simply as a "modules 36"). Modules 36 may be the same as or similar to modules 24 described above in conjunction with FIG. 1. Each module 36 is coupled to a corresponding antenna element which may be the same as or similar to the dipole antenna elements shown in FIG. 1 (antenna elements are not explicitly shown in FIG. 2).

It should be appreciated that although in the example of FIG. 2, a single laser source 32 is shown as providing multiple signals (e.g., signals at the same of different wavelengths), in other embodiments the system may comprise multiple laser sources each of which may provide one or more laser signals. Each of such multiple laser sources may be capable of providing one or more signals at the same of different wavelengths.

Each module 36 comprises an optical modulator which converts received antenna signals to an optical signal at its dedicated wavelength and allows the remaining WDM signals to pass through. These modulated optical signals return via another optical fiber (e.g., a silica fiber) through isolation circuit 34 to a demultiplexer (DEMUX) for separation by wavelength and each channel is converted to an electrical via detector/converter circuit 40 signal for processing via a beamforming network (BFN) 42.

The example flexible photonics Photonics/RF linear dipole phased array antenna of FIG. 2 may be appropriate for use in receive applications (e.g., an RF receive system).

In embodiments, multiple photonics/RF linear dipole phased array antennas may be orthogonally arranged to provide a dual-polarized planar array antenna. In embodiments, multiple photonics/RF linear dipole phased array antennas may be arranged to provide a conformal receive aperture over a ground plane.

In embodiments, photonics/RF linear dipole phased array antennas may further comprise one or more parasitic reflecting and directing elements (not explicitly shown in FIG. 2). Such one or more parasitic reflecting and directing elements may be used to provide additional desired receive array characteristics.

Referring now to FIGS. 3A-3D in which like elements are provided having like reference designations throughout the several views, a preform-to-fiber draw process for providing a photonics/RF linear array antenna begins with the fabrication of a polymeric preform 44. The preform may be fabricated in layers and consolidated into a solid bar of material using a thermal hot press, for example.

Figure 3A:
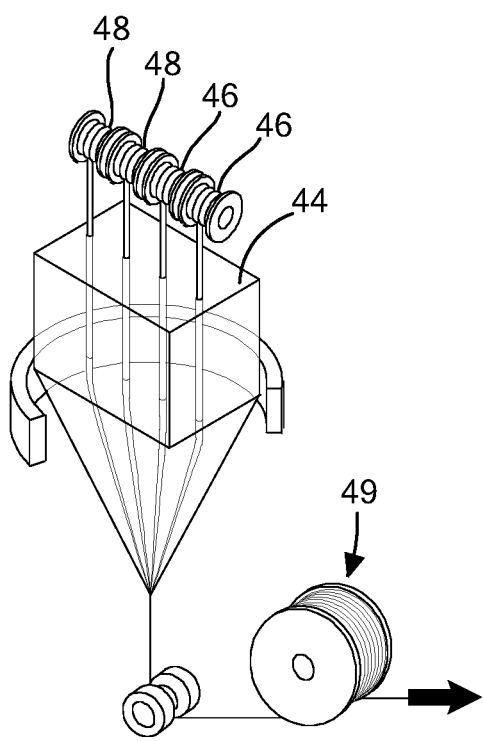

As shown in FIG. 3A, one or more electrical conductors 46 and one or more fiber optic cables 48 (also referred to as optical fibers) may be threaded or otherwise disposed through channels within the preform. In embodiments, the preform may be mounted or otherwise disposed on a draw tower (not explicitly shown in FIGS. 3A-3D) to be lowered into a heating region such as a draw tower furnace (not explicitly shown in FIGS. 3A-3D, but suggested by cylindrical cross section surrounding preform 44). The one or more electrical conductors and the one or more fiber optic cables are drawn into a polymer fiber (e.g., a PEI fiber) to form a reel of cladded wiring board 49. As the polymer is heated to above its glass transition temperature, it softens and can be drawn down into a long continuous flexible fiber carrier. The result is a flexible carrier fiber (e.g., a PEI carrier fiber) that can be hundreds of meters in length, with copper wires and fiber optic cables in alignment. The fiber is then ready for milling and insertion of RF and photonics components.

Figure 3B:
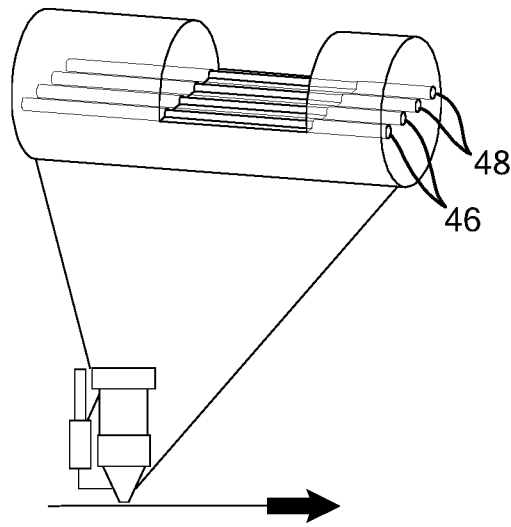

As illustrated in FIG. 3B, the flexible carrier fiber (e.g., a PEI fiber with cladding) having aligned electrical conductors and fiber optic cables disposed therein has PEI cladding locally removed (i.e., portions of the PEI cladding are removed to expose one or more of the one or more electrical conductors 46 and/or one or more of the one or more optical fibers 48). The PEI cladding may be removed via a milling procedure or other mechanical procedure such that one or more dipole antenna elements may be provided and allow access a power bus (e.g., electrical conductors 46) and optical transmission lines (e.g., optical fibers 48).

Figure 3C:
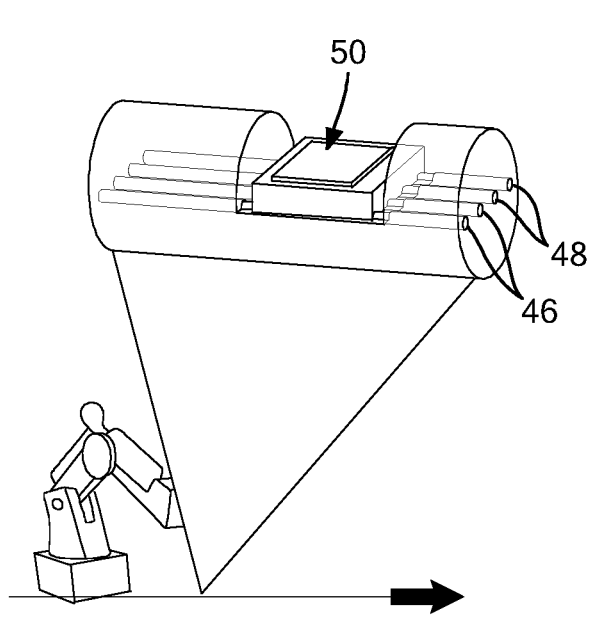

As illustrated in FIG. 3C, discrete components 50 may be inserted into the access openings provided in the carrier fiber. Components 50 may be the same as or similar to RF/optical modules 24 or 36 described above in conjunction with FIGS. 1 and 2, respectively.

Figure 3D:
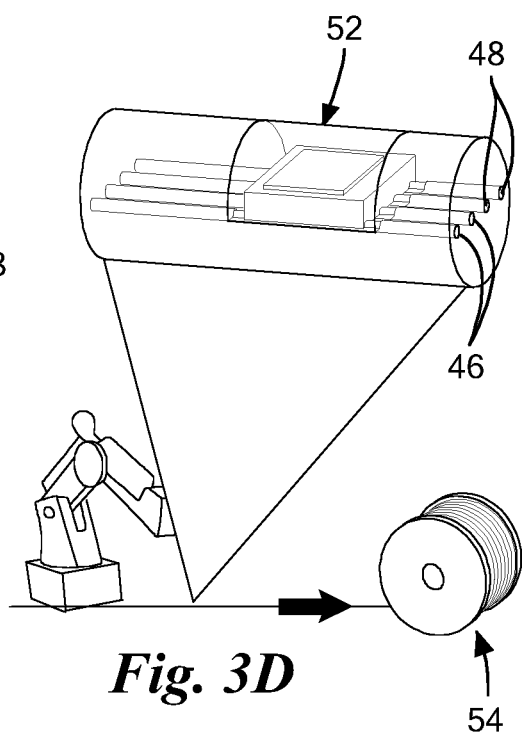

As illustrated in FIG. 3D, the openings formed in the carrier fiber are covered via cover material 52. This may be accomplished, for example, by coating all (i.e., the entire) or portions of the carrier fiber with protective encapsulate and cured. The fiber with embedded devices is rolled into a reel 54.

The fiber drawing process may be performed via fiber drawing tower in which fiber optic transmission lines and electrically conducting copper wires (DC power bus wires and dipole wire) are drawn from spools proximate a top portion of a tower and fed into a polymer preform that resides within a furnace (or heater) section of the fiber drawing tower. As the polymer carrier material is heated, it is drawn (or pulled) and forms a flexible cladding fiber that encases the integrated electrical and optical elements.

In one example embodiment, fiber optic transmission lines may have a D-shaped cross section, and the flat surface of the D-shaped fiber (i.e., the D-shaped fiber optic transmission line) may be used to make contact with a photonics modulator. Such an approach provides contact with a photonics modulator which contact is improved compared to contact made with a fiber optic transmission line having a circular cross-section (i.e., a round fiber optics transmission line).

In addition, discrete dipole lengths within a PEI fiber carrier must be produced. To provide such discrete dipole lengths, a post-draw mechanical process (e.g., a milling process) may be used to locally cut (or otherwise split, divide, break or shape) the copper wire into separate segments inside the fiber carrier material. A milling process may also be used to create openings in the fiber (i.e., the fiber carrier) such that a semi-automatic pick and place procedure can be used to insert functional circuits (such as may be included in module 24 described above in conjunction with FIG. 1) along the length of the photonics/RF linear array antenna. Such functional circuits include but are not limited to: LNA(s), photonics modulator(s), matching circuit(s), balun(s), voltage regulator(s) and RF-to-optical modulator (s).

Referring now to FIGS. 4A-4C in which like elements are provided having like reference designations throughout the several views, a unit cell 60 of a photonics/RF linear array antenna which may be the same as or similar or the photonics/RF linear array antennas described above in conjunction with FIGS. 1, and 2, comprises PEI cladding 62 disposed about conductors 64, 66, 68.

Conductor 64 corresponds to a dipole antenna element comprising portions 64a, 64b. A feed circuit 70 is offset to provide the antenna element as an offset-fed dipole antenna element. The particular offset to use in any particular application may be determined empirically. In general, the offset is selected to provide the dipole antenna element having a desired input resistance (e.g., an input resistance which is well matched to an impedance of an RF/optical module to which the antenna element is coupled).

FIGS. 4A-4C show the geometry of the unit cell, including the PEI cladding and the power bus wires 66, 68 running parallel to the dipoles 64. In embodiments, the cladding 62 may have a nominal dielectric constant $\varepsilon_r=3$ and a loss tangent $\tan \delta=0.0012$. In addition to marginal dielectric losses, the presence of the PEI reduces the free space wavelength $\lambda_0$ from 689.2 mm at a center frequency to $\lambda_d$ of ~605 mm, corresponding to an effective relative permittivity between 1 and $\varepsilon_r$. (where $\lambda_d$ is the wavelength in a dielectric having a relative dielectric constant $\varepsilon_r=3$). In the example embodiment of FIGS. 4A-4C, d1 (array element spacing) =289 mm; d2 (dipole length)=279 mm; H1=5.33 mm; H2 (Power bus center-to-center distance from dipole)=3.4 mm; and W=1.06 mm.

Table 1 summarizes example design parameters for one example embodiment of a photonics/RF linear array antenna operable in the UHF frequency band.

TABLE I

| Parameter | Value |
| --- | --- |
| Dipole length | 279 mm |
| Dipole wire diameter | 400 μm |
| Feed offset from center of dipole | 72.5 mm |
| Array element spacing | 289 mm |
| Power bus center-to-center distance from dipole | 3.4 mm |
| Power bus center to center spacing (wire to wire) | 600 μm |
| Power bus wire diameter | 400 μm |

In this example, a distance from the dipole to the nearest wire in the two-wire power bus is typically about 3.4 mm. In embodiments, the distance from the dipole to the nearest wire in the two-wire power bus the distance is selected to keep the size of an element module (e.g., element module 36) small.

In this example, the power bus is comprised of wires with 400 μm diameter and 600 μm center to center spacing. The proximity of the metal running parallel to the dipoles acts to short out the antennas and greatly degrades their ability to radiate. Input resistance may be increased by shifting the feed from the center of the dipole towards the end, where the approximately sinusoidal current distribution on the near half-wavelength structure ensures a lower magnitude of current.

Figure 5:
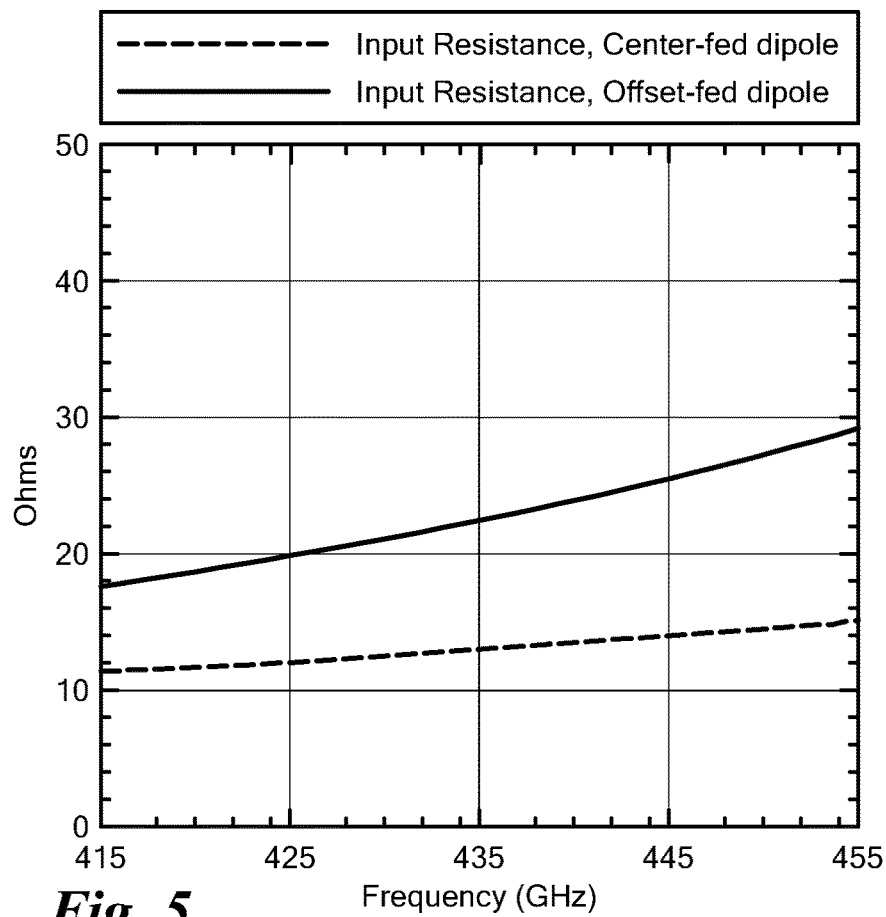
FIG. 5 is a plot of input resistance an offset-fed photonics/RF dipole antenna element unit cell vs. frequency.

FIG. 5 shows the input resistance for an array scanned to broadside and having the example selected offset feed location described in FIGS. 4A-4C. The curves in FIG. 5 compare input resistance of a center-fed dipole, to an offset-fed dipole having the same array spacing and other dimensions as shown in FIGS. 4A-4C and Table 1. Thus, FIG. 5 illustrates an increased input resistance for an offset-fed dipole as opposed to a center-fed dipole, using the geometry shown in FIGS. 4A-4C and summarized in Table 1.

Figure 6:
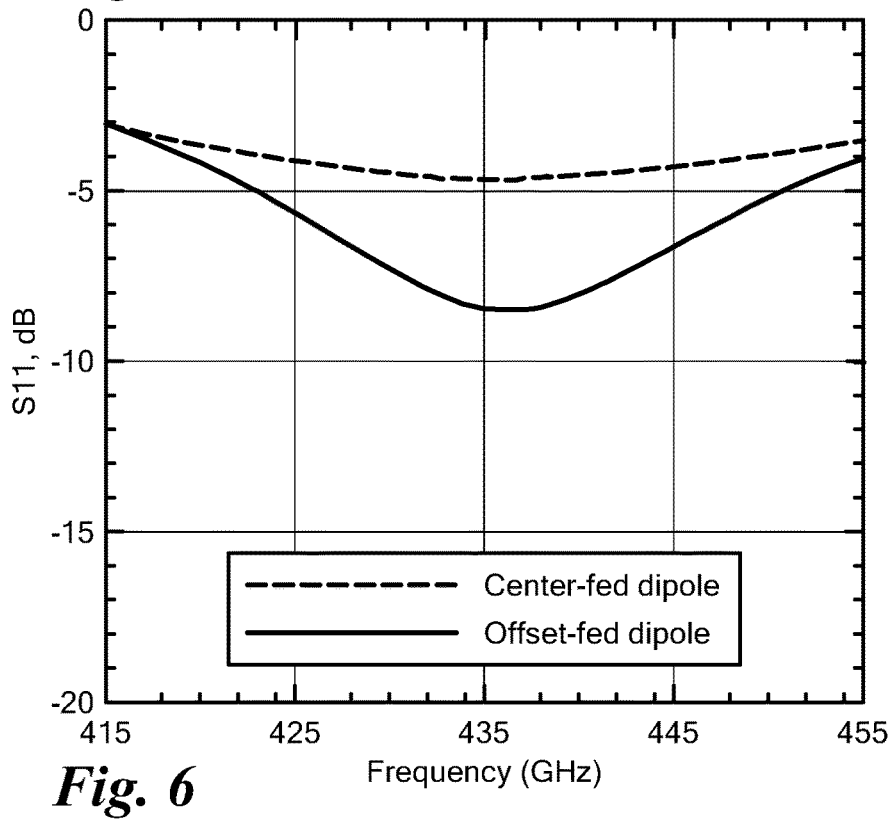
FIG. 6 is a plot of active reflection coefficient for an offset-fed photonics/RF dipole antenna element unit cell vs. frequency.

FIG. 6 illustrates an active reflection coefficient for an offset-fed dipole as opposed to a center-fed dipole, in an array having the geometry shown in Table 1 and scanned to broadside. As can be seen from FIG. 6 the offset-fed dipole results in an improvement in match provided to a 50Ω system.

Figure 7:
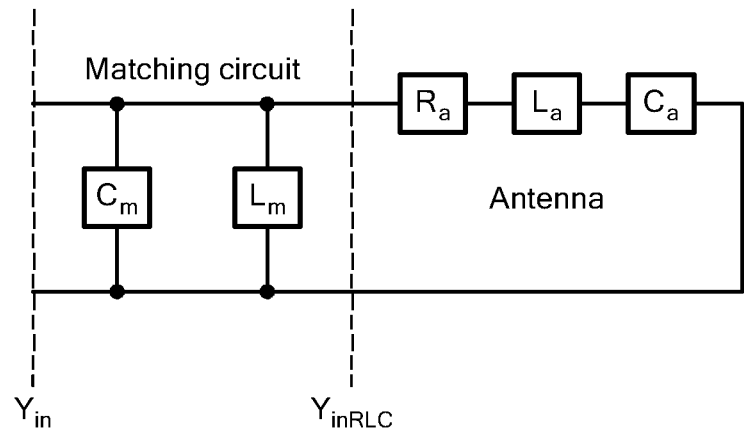
FIG. 7 is a block diagram of a parallel LC matching circuit for a photonics/RF dipole array.

FIG. 7 is a parallel LC matching circuit for the dipole array. Referring now to FIG. 7, In addition to the offset feed, the bandwidth of an array antenna provided in accordance with the concepts described herein is improved by adding a matching network of reactive discrete components shown in FIG. 7. The dipole antenna input impedance is represented as a series RLC circuit, and the parallel inductor ($L_m=1.6$ nH) and capacitor ($C_m=82$ pF) serve to match the antenna impedance to 50Ω near a desired center operating frequency. It should be noted the components are assumed to be lossless, and their values are computed using equations to force three resonances using known techniques.

Figure 8:
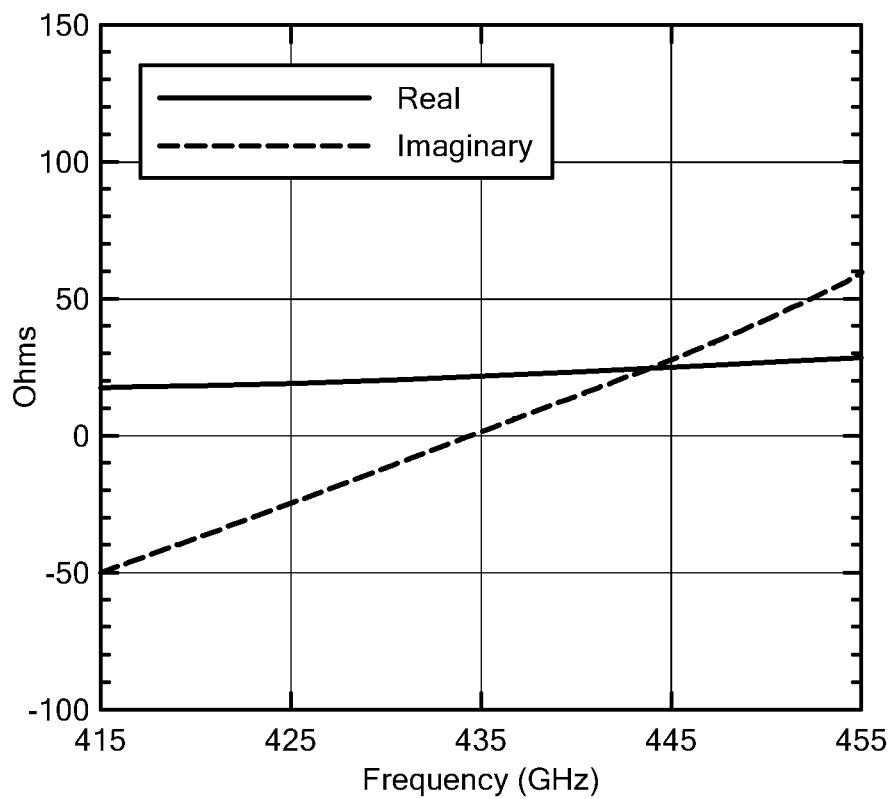
FIG. 8 is a plot of input impedance of an offset-fed photonics/RF dipole antenna element vs. frequency before matching for a photonics/RF dipole antenna array antenna at a broadside scan angle.
Figure 9:
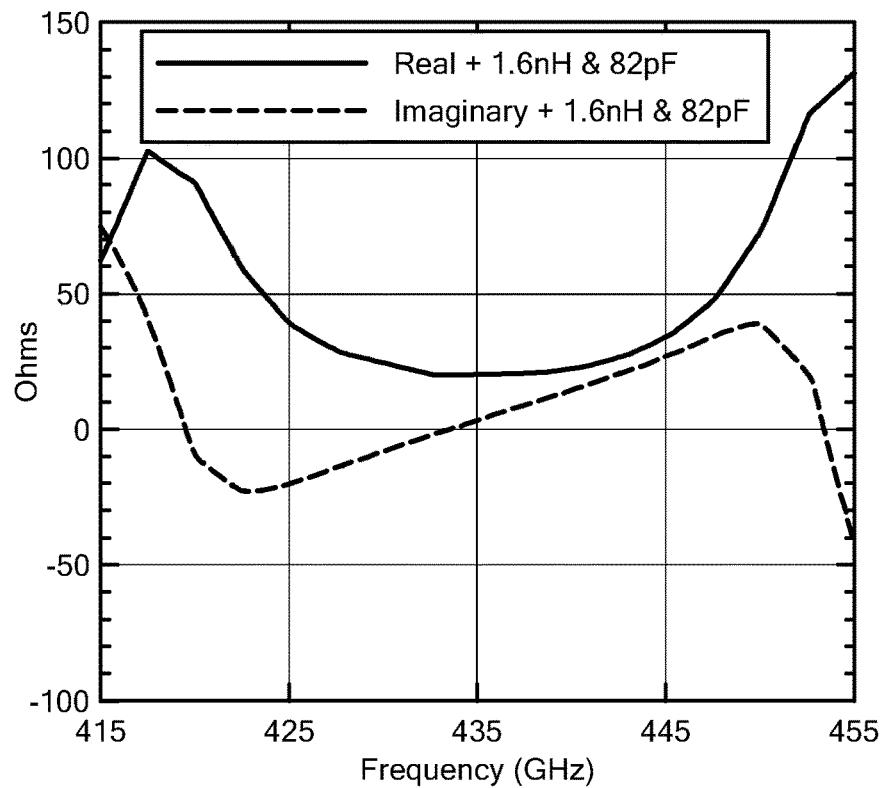
FIG. 9 is a plot of input impedance of an offset-fed photonics/RF dipole antenna element vs. frequency after matching for a photonics/RF dipole antenna array antenna at a broadside scan angle.

FIGS. 8 and 9, Illustrate input impedance before and after LC matching respectively, for a photonics/RF linear dipole array antenna scanned to broadside.

Another effect from the power bus is evident in the far field active element-gain pattern. It is well-known that the active gain for individual elements in an array is decreased due to mutual coupling when compared to isolated element gain. For this geometry, there is also a slight beam splitting that occurs at broadside. Maximum gain is reduced and half-power beamwidth increases by roughly 10° at the center frequency.

Figure 10:
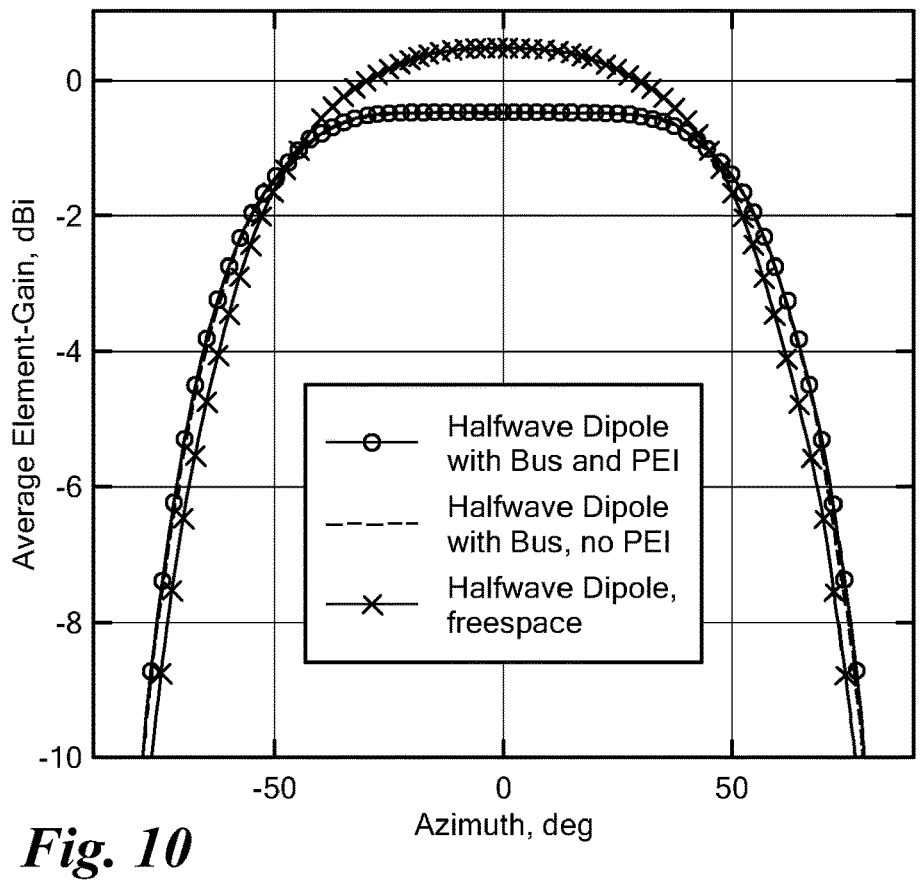
FIG. 10 is a plot of average element gain vs. frequency (an active element-gain pattern) of a center element in an infinite photonics/RF dipole antenna array.

FIG. 10 is a plot of active element-gain pattern in the E-plane for a photonics/RF linear dipole array antenna scanned to broadside. The curves in FIG. 10 compare performance of a resonant dipole in free-space simulated with a unit cell of a photonics/RF linear dipole array antenna scanned to broadside and 0.5 $\lambda_0$ spacing at a center frequency of 435 MHz, with and without the surrounding materials. Dipole geometry including PEI (black line with circles) is as shown in Table 1; otherwise, dipole length and spacing are 320 mm and 330 mm, respectively.

Figure 11:
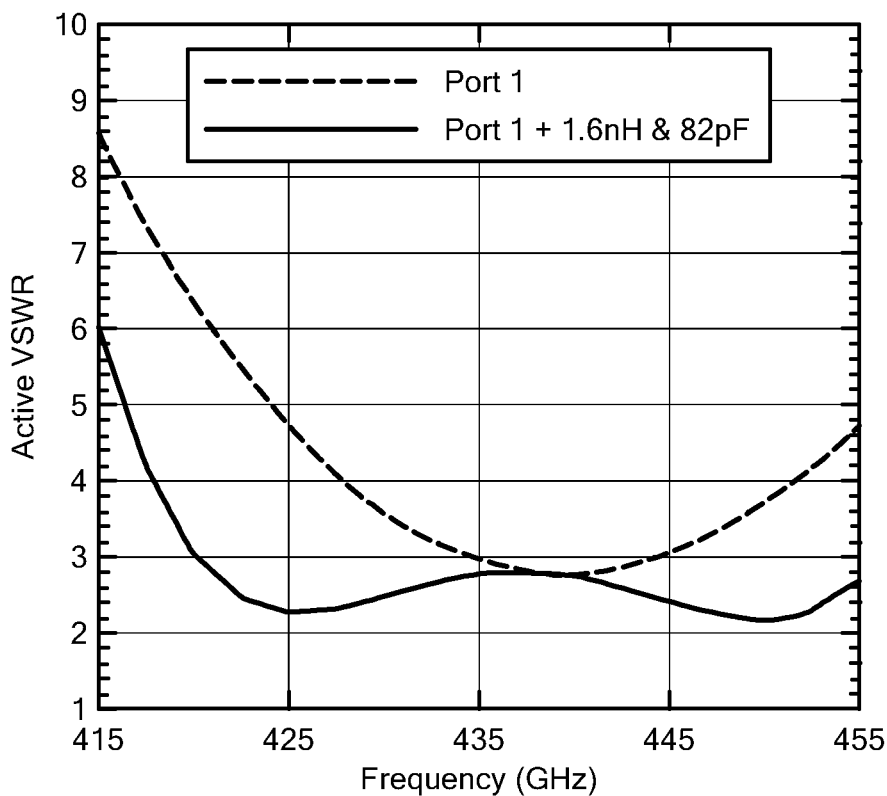
FIG. 11 is a plot of active VSWR vs. frequency before and after LC matching.
Figure 12:
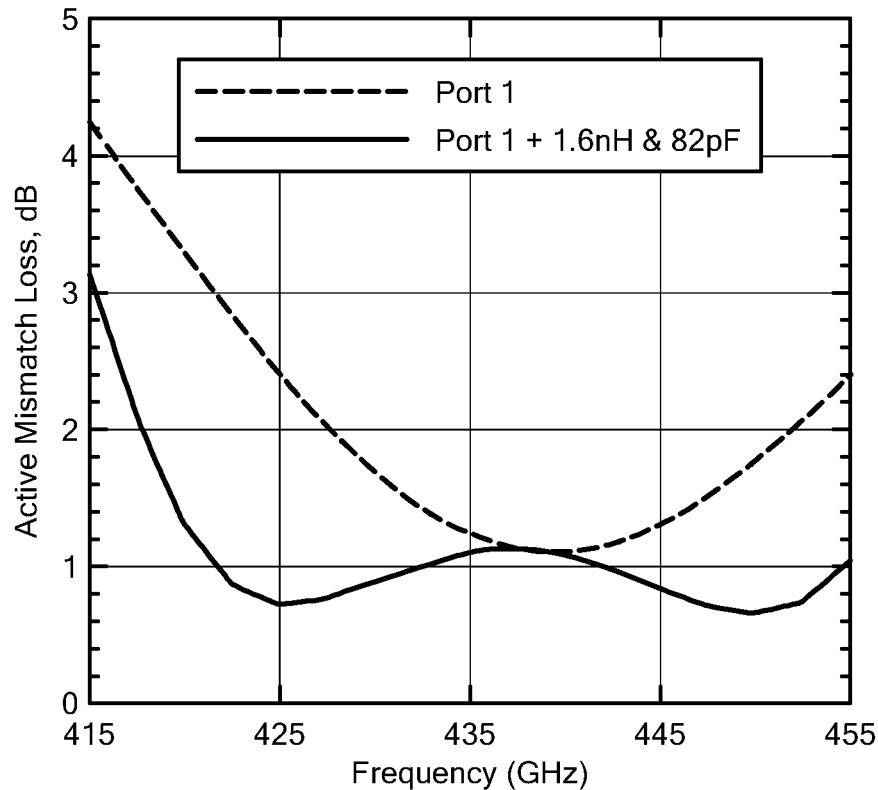
FIG. 12 is a plot of active mismatch loss before and after LC matching, using periodic boundary conditions on a unit cell of a photonics/RF dipole antenna array antenna.

Performance when scanning the main beam of a photonics/RF linear dipole array antenna may be characterized with the active reflection coefficient with scan angle, which may be conveniently represented as a voltage standing wave ratio (VSWR) and mismatch loss as shown in FIGS. 11 and 12. An infinite array analysis assuming a central element location in a large array, so an average reflection coefficient may be used. Under these conditions, beam scanning to +/-25° may be achieved while keeping the active VSWR below 3:1 and mismatch loss below 1.3 dB across the UHF band.

FIG. 11 illustrates an active VSWR before and after LC matching using periodic boundary conditions on a unit cell (via an infinite array analysis). The antenna is scanned to +25° at 435 MHz. It is noted performance improves at lower scan angles and similar when scanned to -25°.

FIG. 12 illustrates an active mismatch loss before and after LC matching, using periodic boundary conditions on a unit cell (via an infinite array analysis). The antenna is scanned to +25° at 435 MHz. It is noted performance improves at lower scan angles and similar when scanned to -25°. For a uniformly excited linear array with theoretical isotropic elements or small omnidirectional elements, the array directivity may be calculated in closed form once spacing and size are defined. An array with other types of elements, such as the resonant dipoles described herein, generally requires numerical integration for accurate calculation of directivity but follows similar trends with element spacing.

For the broadside case, as element spacing is increased up to a wavelength, directivity reaches a maximum before it begins to drop as grating lobes appear. While perfect conductors are used in the simulation model, the losses associated with the dielectric are accounted for, so we discuss gain in lieu of directivity with the understanding that any conductor losses are ignored. In the range of our sub-wavelength array spacing, we can simplistically consider the gain as increasing with increased spacing for a given number of elements.

Array spacing is often limited by the required range of beam scanning angles, but in this case, a possibly more significant consideration involves the milling and curing procedures following the drawing process described above. While the accuracy of metal removal requires tight tolerancing and a sub-mm gap is feasible for the dipole feeds, the maximum amount of metal that may be removed has not been proven beyond an order of centimeters. Too much removal leads to reduced structural integrity due to the need to also remove cladding in the process (e.g., as illustrated in FIGS. 3A-3D). This effectively imposes a lower limit on the maximum spacing for collinear dipole antenna elements.

Given a set spacing, one may increase gain with more elements to form a larger aperture. However, the total number of dipole elements is limited by power delivery to the discrete components required. DC power is distributed to a chain of modules (one for each dipole) via the two power bus lines as illustrated in FIGS. 2 and 13.

Figure 13:
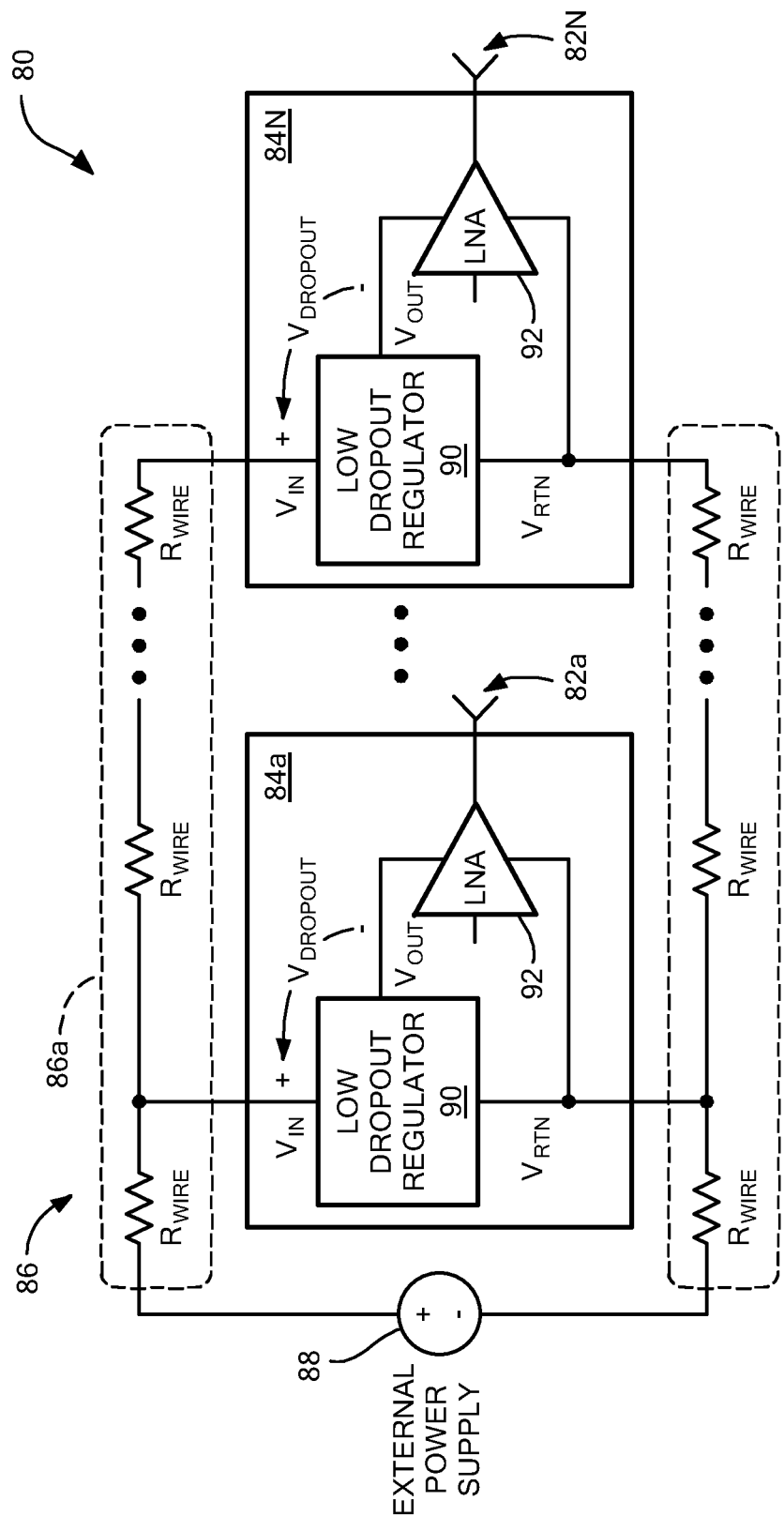
FIG. 13 is a block diagram of DC power distribution to a chain of modules in a photonics/RF dipole antenna array antenna system.

Referring now to FIG. 13, a receive system 10 comprises a photonics/RF linear array antenna having a plurality of antenna elements 82a-82N where N is an integer) with each antenna element coupled to a corresponding one of a plurality of element modules 84a-84N.

Each element module 84a-84N is coupled to a DC power distribution system 86 which is coupled to an external power supply 88. In this example embodiment, the DC power distribution system is illustrated as comprising positive and negative power buses, 86a, 86b.

Although in this example embodiment, each element module 84a-84N is coupled to a corresponding one of the plurality of antenna elements, in other embodiments, one or more element modules 84a-84N may be coupled to more than one antenna element.

Each element module comprises a low dropout voltage regulator coupled to a supply terminal of an RF amplifier which in this example embodiment is illustrated as a low noise amplifier (LNA). It should be appreciated that for clarity, passive components associated with the voltage regulator and the LNA are omitted from FIG. 13 as are optical components.

Since the power bus lines have resistive losses (with such resistive losses being represented as resistors having resistance $R_{wire}$ in FIG. 13), it should be appreciated that the dropout voltage of the regulator at each node should be held higher than a certain threshold voltage $V_{DROPOUT}$ for proper operation. The threshold voltage threshold voltage $V_{DROPOUT}$ is selected in accordance with a variety of factors including, but not limited to, the resistive losses of the power bus lines (and noting that resistive losses of the power bus lines is related to the size/dimensions (e.g., diameter) of the conductors which comprising the power bus limes (e.g., one or more wires having a round cross-sectional shape). In embodiments, the threshold voltage $V_{DROPOUT}$ is held higher than $0.5V_{DC}$ for proper operation (e.g., for a system having parameters such as those described in conjunction with Table 1 above). A maximum number of element modules that may be used in a particular system depends upon a variety of factors, including but not limited to, the input voltage rating of the regulators and the voltage of the external power supply.

Figure 14:
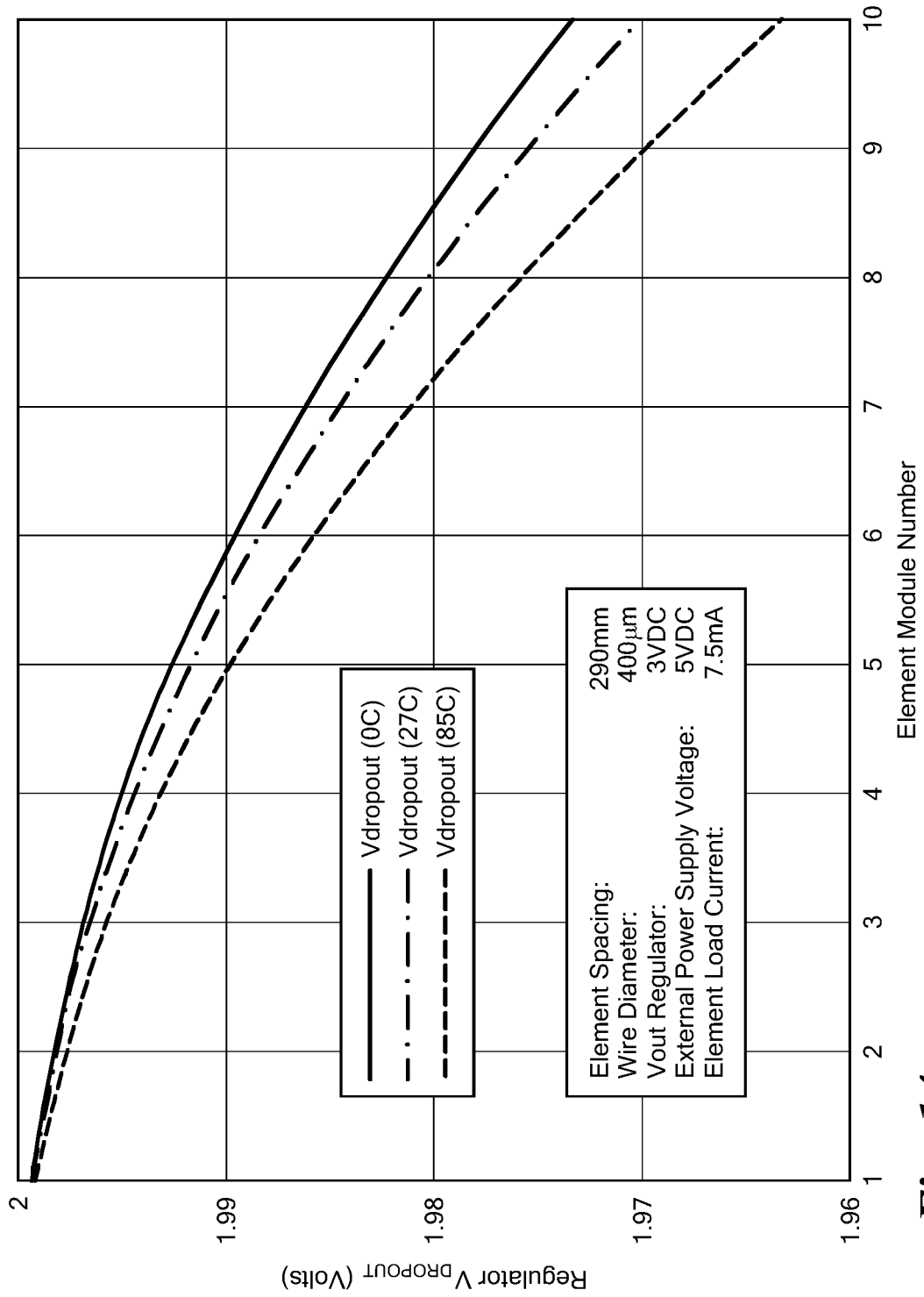
FIG. 14 is a plot of dropout voltage versus a number of element modules.

FIG. 14 is a plot of regulator dropout voltage $V_{DROPOUT}$ vs. a number of element modules. The curves in the plot illustrate expected worst-case dropout voltage as a function of the number of element modules for an example set of element modules having the parameters shown in FIG. 14. The element spacing is the center-to-center spacing of the antenna elements.

With the constraints around array spacing and total number of element modules summarized, one may use the values from the plot of FIG. 14 to determine an expected array gain as described below in conjunction with FIG. 15.

Figure 15:
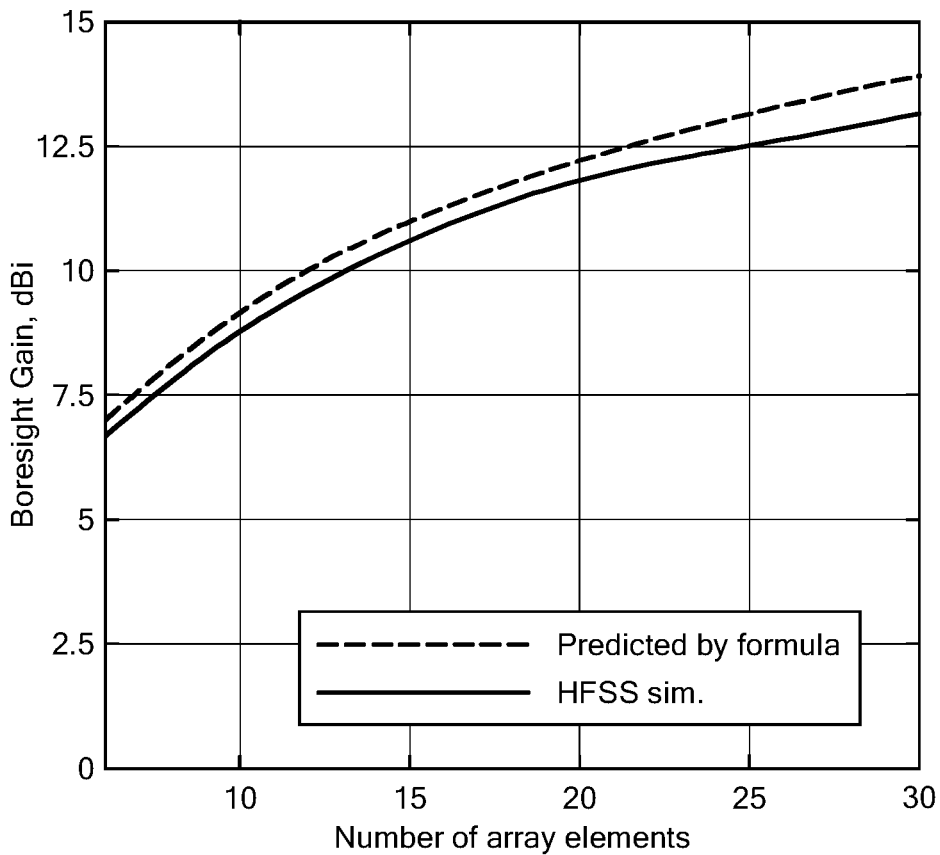
FIG. 15 is a of boresight gain versus number of array elements in a photonics/RF dipole array antenna.

Referring now to FIG. 15, the curves in FIG. 15 illustrate a comparison of boresight gain versus number of elements from simulation and as calculated by approximation to a line source. Array and element dimensions are as listed in FIG. 4 and Table 1.

As noted above, with the constraints around array spacing and total number of elements summarized, one may use the values from the plot of FIG. 14 to determine an expected array gain. As one approximation, the linear gain $G_e$ of a single active element module (i.e., one element module coupled to one antenna element of a photonics/RF linear array antenna) may be multiplied by that of a uniform line source with length Nd where N is the number of element modules and d is the array spacing (e.g., d equals 289 mm in the example described in conjunction with FIG. 4A).

Total gain may then be computed as:

Total Gain=$G_e(1/\lambda)2Nd$ where $\lambda$ is the wavelength.

These results substantially match results of a full-wave simulation, as seen in FIG. 15 for a broadside array.

Figure 16:
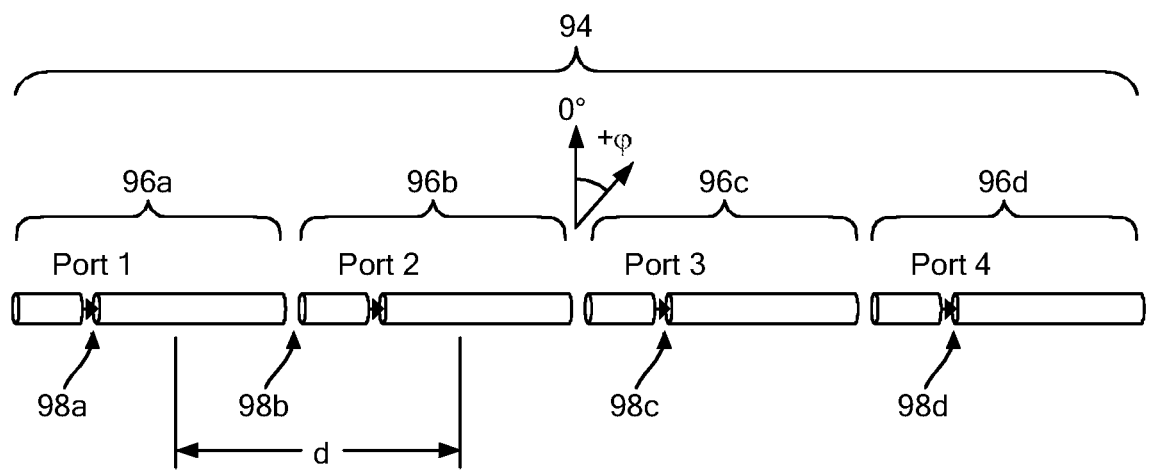
FIG. 16 is a block diagram of a modeled 4-element photonics/RF dipole array antenna.

While infinite array analysis saves computation time and approximates large arrays well, the potentially different scattering environments presented to each antenna element of a small array renders the periodic boundary assumptions inaccurate. To evaluate the scan performance for an array, as will be described below in conjunction with FIG. 16, four (4) collinear dipoles in HFSS with 289 mm element spacing were modelled Referring now to FIG. 16, a photonics/RF linear array antenna 94 comprises four (4) collinear dipole antenna elements 96a-96d having an antenna element spacing d (i.e., center-to-center antenna element spacing). In this example embodiment, d=289 mm. Antenna elements 96a-96d have offset feed circuits (or more simply "feeds") 98a-98d which define antenna ports 1-4. In the example of FIG. 16, power bus and PEI cladding is not shown.

Figure 17:
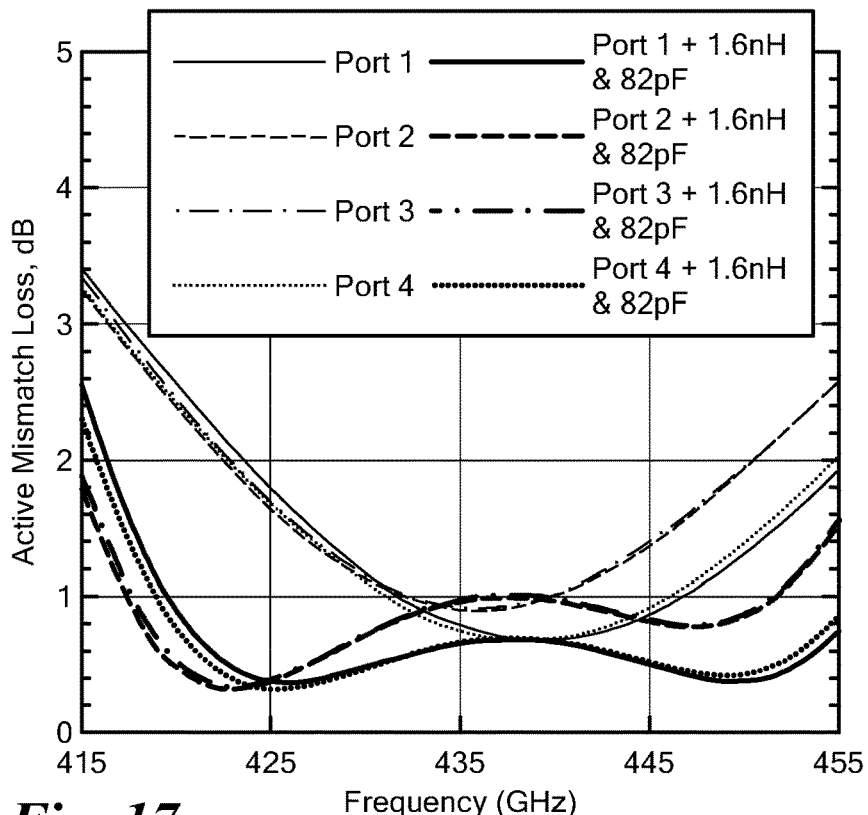
FIG. 17 is a plot of active mismatch loss vs. frequency before and after LC matching for a four-element photonics/RF dipole linear array antenna scanned at broadside.
Figure 18:
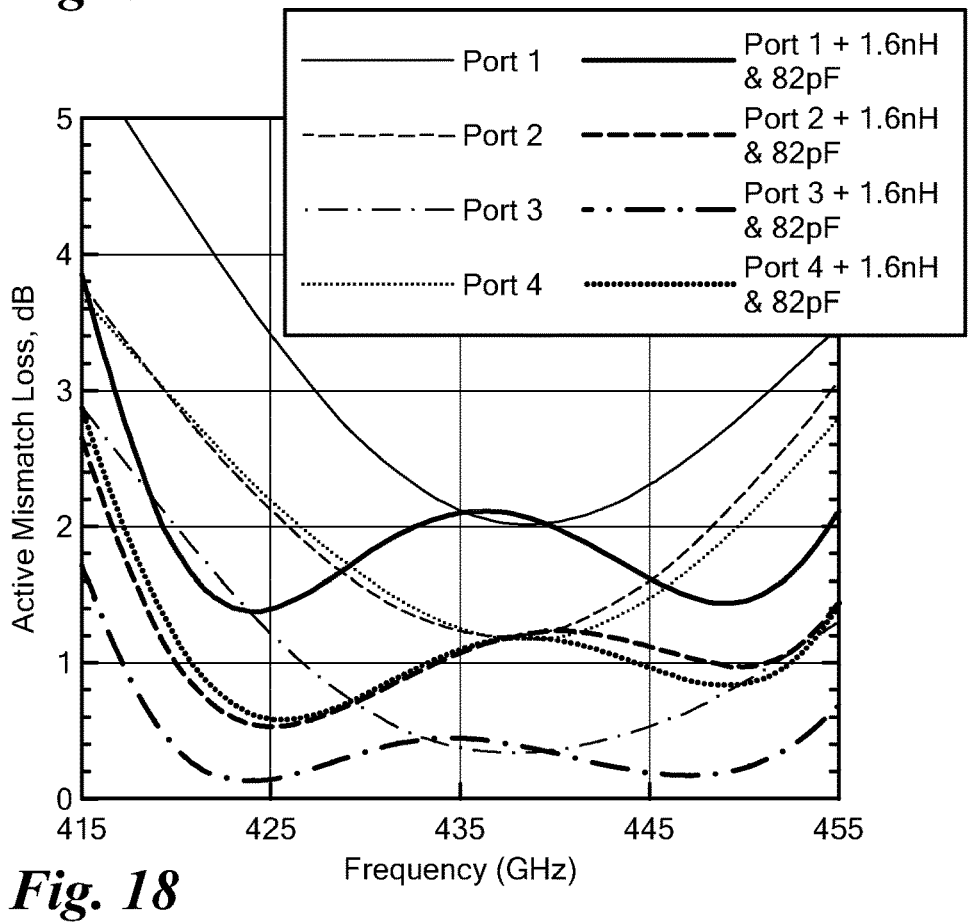
FIG. 18 is a plot of active mismatch loss vs. frequency before and after LC matching for a four-element photonics/RF dipole linear array antenna scanned at an angle of −15° at a frequency of 435 MHz.
Figure 19:
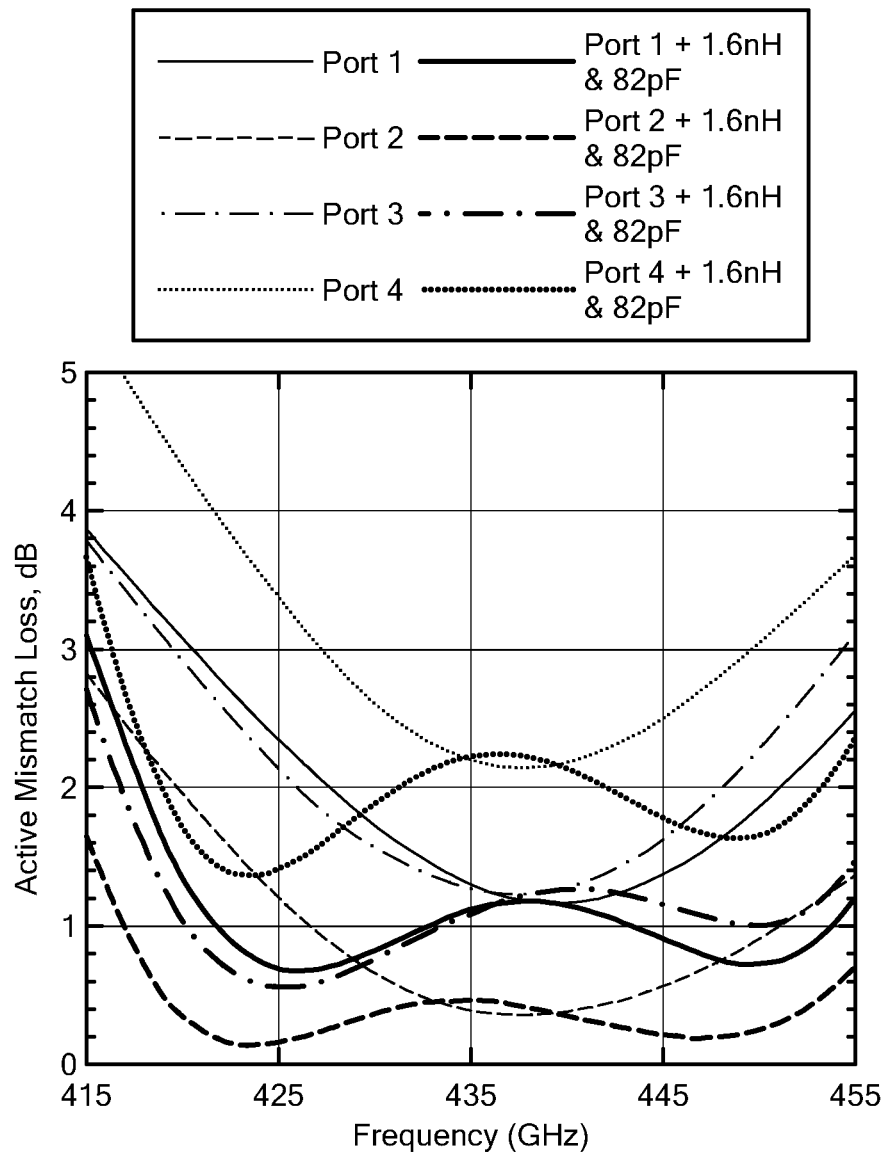
FIG. 19 is a plot of active mismatch loss vs. frequency before and after LC matching for a four-element photonics/RF dipole linear array antenna scanned at an angle of +15° at a frequency of 435 MHz.

The 4-element array of FIG. 16 was modeled (including the power bus and PEI cladding) and results based upon the model are shown in FIGS. 17-19.

Based upon the model, an active mismatch loss for a photonics/RF linear array antenna coupled to a plurality of element modules with the array being scanned to broadside are shown in FIG. 17 for each of the four ports of the array. The dashed lines represent performance for the antenna ports without LC networks, while the solid lines include an ideal LC network at each port. Edge effects are readily observed in the discernible resonance shift between the edge (ports 1,4) and center (ports 2,3) elements.

FIG. 17 is an active mismatch loss before and after LC matching for a broadside scanned four-element linear array;

Performance for beam scanning up to +/−15° is shown in FIGS. 18, and 19. While a large array would result in scan characteristics similar to those reported herein, a small array may only get close to that for a portion of its elements. In this case, for some portion of the UHF band, the mismatch loss for one of the edge elements is slightly over 2 dB.

FIG. 18 illustrates an active mismatch loss before and after LC matching for a four-element linear array as described in FIG. 16 scanned to −15° at 435 MHz.

FIG. 19 illustrates an active mismatch loss before and after LC matching for a four-element linear array as described in FIG. 16 scanned to +15° at 435 MHz.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

As used herein, "including" means including without limitation. As used herein, the terms "a" and "an", when modifying a noun, do not imply that only one of the noun exists. As used herein, unless the context clearly indicates otherwise, "or" means and/or. For example, A or B is true if A is true, or B is true, or both A and B are true. As used herein, "for example", "for instance", "e.g.," and "such as" refer to non-limiting examples that are not exclusive examples. The word "consists" (and variants thereof) are to be given the same meaning as the word "comprises" or "includes" (or variants thereof).

The above description (including any attached drawings and figures) illustrate example implementations of the concepts described herein. However, the concepts described herein may be implemented in other ways. The methods and apparatus which are described above are merely illustrative applications of the principles of the described concepts. Numerous modifications may be made by those skilled in the art without departing from the scope of the invention. Also, the described concepts includes without limitation each combination, sub-combination, and permutation of one or more of the abovementioned implementations, embodiments and features.

Accordingly, although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A photonics/radio frequency (RF) array antenna system comprising:
   a plurality of dipole antenna elements;
   one or more optical input signal paths coupled to the plurality of RF/optical modules;
   one or more optical output signal paths coupled to the plurality of RF/optical modules;
   a plurality of RF/optical modules coupled to respective ones of the plurality of dipole antenna elements, and coupled to at least one of the one or more optical input signal paths and at least one of the one or more optical output signal paths, the RF/optical modules configured to process RF signals provided thereto from the respective one of the plurality of dipole antenna elements and provide optical signals at one or more outputs thereof; and
   a fiber material encapsulating the plurality of dipole antenna elements, the plurality of RF/optical modules, the one or more optical input signal paths and the one or more optical output signal paths.

2. The photonics/RF array antenna system of claim 1 further comprising at least one power bus coupled to the plurality of RF/optical modules.

3. The photonics/RF array antenna system of claim 2 wherein the plurality of dipole antenna elements are arranged in the fiber material as a linear array of dipole antenna elements.

4. The photonics/RF array antenna system of claim 3 further comprising a plurality of offset RF feed circuits, each of the plurality of offset RF feed circuits coupled to a corresponding one of the plurality of dipole antenna elements at a point which is offset from a center point of the dipole antenna element to which the offset RF feed circuit is coupled.

5. The photonics/RF array antenna system of claim 4 wherein an amount of offset of the offset RF feed circuit is selected based upon a characteristic of the at least one power bus.

6. The photonics/RF array antenna system of claim 5 wherein an amount of offset of the offset RF feed circuit is selected based upon a distance of the at least one power bus to a dipole antenna element.

7. The photonics/RF array antenna system of claim 5 wherein the at least one power bus comprises a pair of electrically conducting wires and an amount of offset of the offset RF feed circuit is selected based upon one or more characteristics of the pair of electrically conducting wires.

8. The array antenna system of claim 1 wherein:
   the fiber material is a flexible polyetherimide (PEI) fiber material; and the plurality of dipole antenna elements are encapsulated in the flexible PEI fiber material.

9. The array antenna system of claim 1 wherein the RF/optical modules comprise:
   means for coupling RF signals from each fiber encapsulated antenna elements to a respective one of the RF/optical modules to;
   one or more RF amplifiers configured to receive RF signals from a corresponding one of the fiber encapsulated antenna elements; and
   one or more RF-to-optical converters, coupled to receive an RF signal provided to a first input port thereof, an optical signal provided to a second input port thereof and to provide a corresponding optical signal at an output port thereof.

10. A flexible thermally-drawn dipole receive phased array antenna comprising:
   a plurality of dipole antenna elements;
   one or more low noise amplifiers (LNAs), each of the one or more LNAs configured to receive signals from one or more of the plurality of dipole antenna elements;
   a pair of electrically conducting wires disposed proximate at least some of the plurality of dipole antenna elements wherein the pair of electrically conducting wires are configured to couple one or more DC bias signals to the one or more LNAs;
   a like plurality of offset feed circuits, each offset feed circuit coupled to a corresponding one the plurality of dipole antenna elements at a point which is offset from a center point of the dipole antenna elements wherein an amount of the offset is selected to provide a selected impedance match between the plurality of dipole antenna elements and corresponding ones of the one or more low noise amplifiers (LNAs) to which the dipole antenna elements are coupled; and
   a fiber material encapsulating the plurality of dipole antenna elements and the one or more LNAs.

11. The flexible thermally-drawn dipole receive phased array antenna of claim 10 wherein an amount by which each offset feed circuit is offset from the center point of the dipole antenna element to which it is coupled is selected based upon a location of the pair of electrically conducting wires.

12. The flexible thermally-drawn dipole receive phased array antenna of claim 10 wherein the one or more LNAs correspond to a plurality of LNAs, each of the plurality of LNAs configured to receive signals from one or more of the plurality of dipole antenna elements.

13. The flexible thermally-drawn dipole receive phased array antenna of claim 10 wherein the one or more LNAs correspond to a plurality of LNAs, each of the plurality of LNAs configured to receive signals from a corresponding one of the plurality of dipole antenna elements.

14. The flexible thermally-drawn dipole receive phased array antenna of claim 10 wherein the plurality of dipole antenna elements are arranged as a linear array of dipole antenna elements.

15. The flexible thermally-drawn dipole receive phased array antenna of claim 10 further comprising a plurality of radio frequency (RF)/optical modules, each of the plurality of RF/optical modules coupled to a corresponding one of the plurality of dipole antenna elements wherein the fiber material encapsulates the plurality of RF/optical modules.

16. A phased array system comprising:
   a plurality of dipole antenna elements;
   a plurality of radio frequency (RF)/optical modules, each of the plurality of RF/optical modules coupled to a corresponding one of the plurality of dipole antenna elements;
   one or more optical input signal paths coupled to the plurality of RF/optical modules;
   one or more optical output signal paths coupled to the plurality of RF/optical modules; and
   one or more electrically conducting wires disposed to couple one or more DC bias signals to the plurality of RF/optical modules; and
   a fiber material encapsulating the plurality of dipole antenna elements, the plurality of RF/optical modules, the one or more electrically conducting wires, the one or more optical input signal paths and the one or more optical output signal paths.

17. The phased array system of claim 16 wherein the one or more electrically conducting wires are disposed in proximity to at least some of the plurality of dipole antenna elements.

18. The phased array system of claim 16 further comprising a plurality of offset feed circuits, selected to provide an input impedance match between the dipole antenna element and the RF/optical module to which the dipole antenna element is coupled.

19. The phased array system of claim 18 wherein an amount of offset of each of the respective ones of the plurality of offset feed circuits is selected based upon a distance of the one or more electrically conducting wires to the respective ones of the plurality of dipole antenna elements.

20. The phased array system of claim 19 wherein the plurality of RF/optical modules comprise:
   one or more RF amplifiers configured to receive RF signals from a corresponding one of the plurality of fiber encapsulated dipole antenna elements; and
   one or more RF-to-optical converters, coupled to receive an RF signal provided to a first input port thereof, an optical signal provided to a second input port thereof and to provide a corresponding modulated optical signal at an output port thereof.

* * * * *